(12) United States Patent
Drugge et al.

(10) Patent No.: US 9,294,725 B1
(45) Date of Patent: Mar. 22, 2016

(54) PROVIDING BACKSTAGE SUPPORT FOR ONLINE VIDEO COMMUNICATION BROADCASTS

(71) Applicant: Google Inc., Mountain View, CA (US)

(72) Inventors: Mikael Lennart Drugge, Stockholm (SE); Karl Gustav Hållberg, Lindingo (SE); Jens Frederik Oja, Vallentuna (SE); Matthew John Leske, Stockholm (SE)

(73) Assignee: Google Inc., Mountain View, CA (US)

( * ) Notice: Subject to any disclaimer, the term of this patent is extended or adjusted under 35 U.S.C. 154(b) by 69 days.

(21) Appl. No.: 14/215,716

(22) Filed: Mar. 17, 2014

Related U.S. Application Data (63) Continuation of application No. 13/448,041, filed on Apr. 16, 2012, now Pat. No. 8,693,648.

(51) Int. Cl.
*H04N 7/14* (2006.01)
*H04N 7/15* (2006.01)

(52) U.S. Cl.
CPC .................................... *H04N 7/15* (2013.01)

(58) Field of Classification Search
CPC ...................................................... H04N 7/14
USPC ................................ 348/14.03, 14.08, 14.12
See application file for complete search history.

(56) References Cited

U.S. PATENT DOCUMENTS

| | | | | |
|---|---|---|---|---|
| 9,001,178 | B1* | 4/2015 | Leske et al. | 348/14.08 |
| 2006/0244818 | A1* | 11/2006 | Majors et al. | 348/14.08 |
| 2009/0015659 | A1* | 1/2009 | Choi | H04N 7/152 |
| | | | | 348/14.09 |
| 2015/0002618 | A1* | 1/2015 | Meek | 348/14.09 |

* cited by examiner

*Primary Examiner* — Olisa Anwah
(74) *Attorney, Agent, or Firm* — Patent Law Works LLP

(57) ABSTRACT

The present disclosure comprises systems and methods for broadcasting video communications including video conferences or hosted programs by providing a capability for easily moving participants in and out of the video communications, as necessary. Video communications may be "aired" or broadcast to viewers. The present systems and methods designate at least two stages in the video communication broadcasts, including a "front" stage and a "back" stage. Users who are immediate (e.g., current) participants in the video communication broadcast are provided access to the "front" stage of the video communication broadcast. Those users who are initially "guests" (e.g., will be, but are not yet, immediate or current participants in the video communication broadcast) are provided access first to a back "stage" of the video communication broadcast. A filter imposes restrictions on the back stage to prevent any broadcast of activities that may occur in the back stage to viewers.

24 Claims, 9 Drawing Sheets

PROVIDING BACKSTAGE SUPPORT FOR ONLINE VIDEO COMMUNICATION BROADCASTS

CROSS REFERENCE TO RELATED APPLICATIONS

This application is a continuation of U.S. application Ser. No. 13/448,041, entitled "Providing Backstage Support for Online Video Communication Broadcasts" filed Apr. 16, 2012, the entirety of which is herein incorporated by reference.

BACKGROUND

The present disclosure relates to video communications via online services or communities, for example, social networks. In particular, the present disclosure relates to broadcast of video communications to viewer devices.

Over the years, video communications have become increasingly popular. A number of video "chat" programs have emerged in recent years, offering a variety of formats and services. Some of these services integrate video technology with social networks. Video communications, including video conferences or other video programs, for example "talk shows" or "interviews" are broadcast to viewers. A problem with traditional video communications and hosted video programs is that a host must rely on a guest's discretion to make an appearance at the appropriate time. A guest's timely appearance may also be hindered by technical problems, sometimes, causing the host and the entire broadcast great embarrassment.

Existing technologies do not synchronize guest appearances or participation in video communications, especially one that is "on air" or broadcast to viewers.

With the ongoing trends and exponential growth in video communications, it would certainly be beneficial to find better ways to facilitate video communications with high quality broadcasts to hundreds, thousands, perhaps even millions of viewers.

SUMMARY

The present disclosure overcomes the deficiencies and limitations of the prior art by providing technology comprising systems and methods for broadcasting video communications including video conferences or hosted programs by video communication, for example, "talk shows," "interviews," or the like, by providing a capability for easily moving participants in and out of the video communications, as necessary. Video communications may be "aired" or broadcast to viewers (e.g., users watching the broadcast video communication session on a computer or other device, but not participating and/or providing video feeds to the broadcast video communication session). There may be hundreds, thousands, or even millions of viewers. To facilitate enhanced broadcasts with little disruption, the present systems and methods designate at least two virtual stages in the video communication broadcasts, including a "front" stage and a "back" stage. Users are identified for participation in the video communication broadcast as either "participants" or "guests." Users who are immediate (e.g., current) participants in the video communication broadcast are provided access to the "front" stage of the video communication broadcast. Those users who are initially "guests" (e.g., will be, but are not yet, immediate or current participants in the video communication broadcast) are provided access first to a back "stage" of the video communication broadcast. The front stage and back stage create virtual "rooms" in which users either sit and wait or engage in the video communication broadcast. A moderator, host, or a designated participant has a capability to move users in and out of the front or back stage, by changing user status from a guest to a participant (e.g., adding the user's video feed into the broadcast video communication session or from changing a user from inactive to active status (e.g., removing the user's video feed from the broadcast communication session). A filter imposes one or more restrictions on the back stage to prevent any broadcast of activities that may occur in the back stage to viewers. These restrictions include control of audio and video input streams, by a host, moderator, or designated participant in the front stage.

In some embodiments, the technology provides a computer-implemented method for executing broadcast of video communication among a plurality of user devices, a) by designating, using one or more computing devices, at least two virtual stages for the broadcast of the video communication, including a virtual front stage and a virtual back stage; b) identifying, using the one or more computing devices, user devices from the plurality of user devices for participation in the broadcast of the video communication, including a first subset of user devices to connect to the virtual front stage of the broadcast of the video communication, and a second set of user devices to connect to the virtual back stage of the broadcast of the video communication; c) receiving, using the one or more computing devices, an indication to move a particular user device from the second set of user devices to the virtual front stage; d) by moving, based at least in part on the indication, the particular user device to the virtual front stage, connecting, using the one or more computing devices, the particular user device to the front stage; e) filtering out, using the one or more computing devices, any communications occurring in the back stage from the broadcast of the video communication; and f) broadcasting the video communication, using the one or more computing devices, only those communications that occur among the users in the front stage to viewer devices.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

Overview

Various embodiments herein provide for broadcasting video communication including video conferences or hosted programs by video communication, for example "talk shows," "interviews," or the like, by providing a capability for easily moving participants in and out of the video communications, as necessary. Video communications may be "aired" or broadcast to viewers (e.g., users watching the broadcast video communication session on a computer or other device, but not participating and/or providing video feeds to the broadcast video communication session). There may be hundreds, thousands, or even millions of viewers. To facilitate enhanced broadcasts with little disruption, the present systems and methods designate at least two virtual stages in the video communication broadcasts, including a "front" stage and a "back" stage. Users are identified for participation in the video communication broadcast as either "participants" or "guests." Users who are immediate (e.g., current) participants in the video communication broadcast are provided access to the "front" stage of the video communication broadcast. Those users who are initially "guests" (e.g., will be, but are not yet, immediate or current participants in the video communication broadcast) are provided access first to a back "stage" of the video communication broadcast. The front stage and back stage create virtual "rooms" in which users either sit and wait or engage in the video communication broadcast. A moderator, host, or a designated participant has a capability to move users in and out of the front or back stage, by changing user status from a guest to a participant (e.g., adding the user's video feed into the broadcast video communication session or from changing a user from inactive to active status (e.g., removing the user's video feed from the broadcast communication session). A filter imposes one or more restrictions on the back stage to prevent any broadcast of activities that may occur in the back stage to viewers.

In some examples, the specification describes systems and methods for providing support in video communications in an online community, for example, social networks, by designating two stages in the video communications. In the following description, for purposes of explanation, numerous specific details are indicated in order to provide a thorough understanding of the technology described. It should be apparent, however, to one skilled in the art, that this technology can be practiced without these specific details. In other instances, structures and devices are shown in block diagram form in order to avoid obscuring the technology. For example, the present technology is described with some embodiments below with reference to user interfaces and particular hardware. However, the present technology applies to any type of computing device that can receive data and commands, and any devices providing services. Moreover, the present technology is described below primarily in the context of providing support for video communication broadcasts to enhance and improve the quality of these broadcasts in order to facilitate viewing to hundreds, thousands, if not millions of viewers; however, those skilled in the art should understand that the present technology applies to any type of communication and can be used for other applications beyond video communications. In particular, this technology for creating a back room or stage may be used in other contexts besides video communications.

Reference in the specification to "one embodiment," "an embodiment," or "some embodiments" means simply that one or more particular features, structures, or characteristics described in connection with the one or more embodiments is included in at least one or more embodiments that are described. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory of either one or more computing devices. These algorithmic descriptions and representations are the means used by those skilled in the data processing arts to most effectively convey the substance of their work to others skilled in the art. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms such as "processing," "computing," "calculating," "determining," or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology can take the form of an entirely hardware embodiment, an entirely software embodiment, or an embodiment containing both hardware and software components. In some embodiments, this technology is implemented in software, which includes but is not limited to firmware, resident software, microcode, etc.

Furthermore, this technology can take the form of a computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description below. In addition, the present technology is not described with reference to any particular programming language. It should be understood that a variety of programming languages may be used to implement the technology as described here.

System Overview

Figure 1:
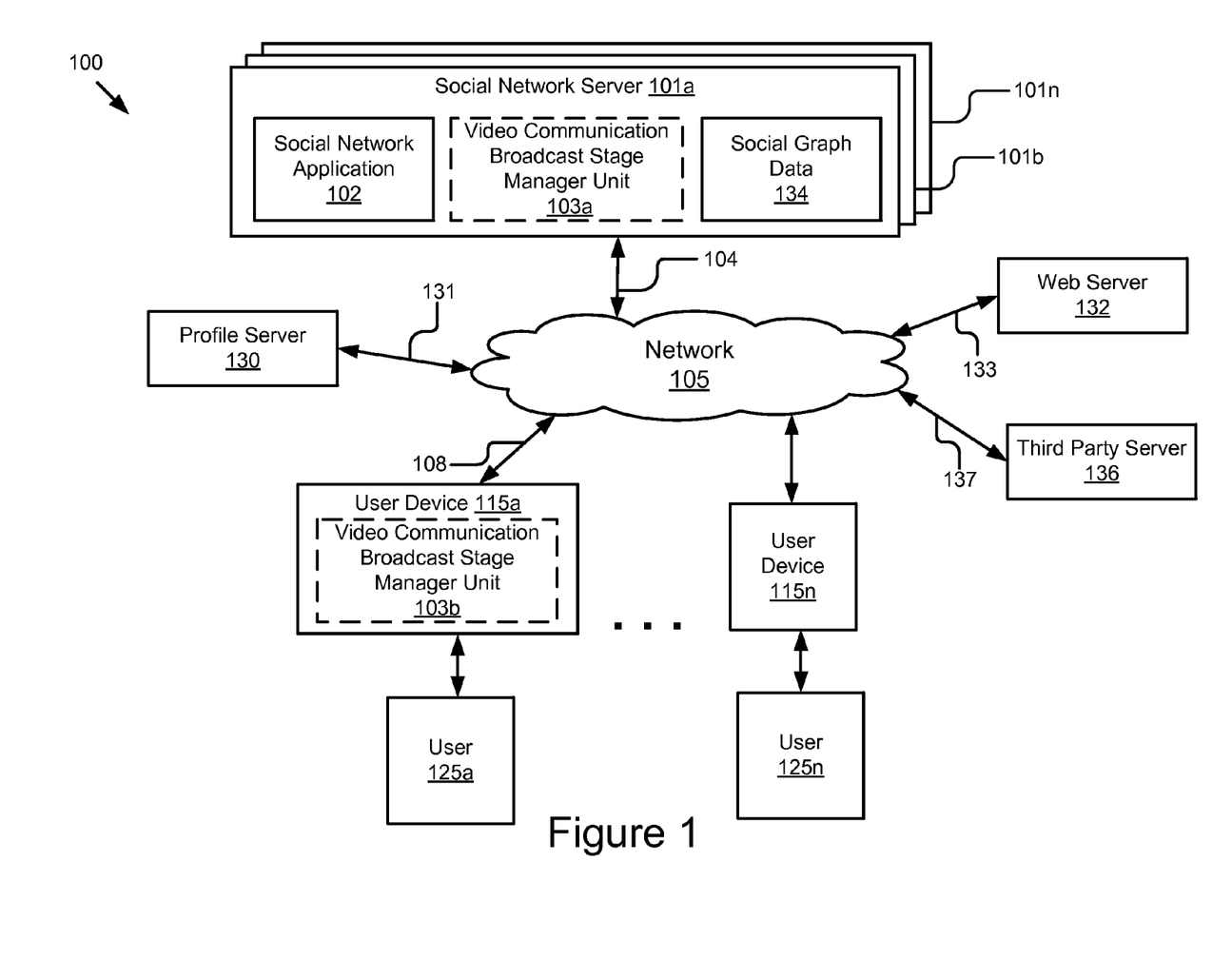
FIG. 1 is a high-level block diagram illustrating some embodiments of a system for providing backstage support for online video communication broadcasts including a plurality of social network servers with a video communication broadcast stage manager unit.

FIG. 1 is a high-level block diagram illustrating some embodiments of systems for providing support for video communication broadcasts in an online service or community, for example, a social network, to enhance the quality of the broadcasts. The system 100 illustrated in FIG. 1 provides support for video communication broadcasts so that participants may join or leave the video communication broadcasts, without disruption or mishap, making transitions seamless. The system 100 includes one or more social network servers 101a, 101b, through 101n, that may be accessed via user devices 115a through 115n, which are used by users 125a through 125n, to connect to any one of the social network servers 101a, 101b, through 101n. These entities (user devices 115a-115n and social network servers 101a-101n) are communicatively coupled via a network 105. Although only two user devices 115a through 115n are illustrated, any numbers of user devices 115n may be used by any number of users 125n. Moreover, those skilled in the art should recognize that while the present disclosure is described below primarily in the context of providing support for video communication broadcasts, the present disclosure may be applicable to video communications that are not broadcast to viewer devices or applicable to any type of online communications (without video), which may or may not be broadcast. By way of one example, users conduct video communications (having a video feed and an audio feed) via social networks, for example, by video "chat" within virtual spaces or "rooms" that are created to "hang out." These types of video communications may be easily controlled or regulated by a moderator or the host, who may easily filter out user devices that violate a certain code of conduct. In such instances, user devices may be urged out of the virtual space and spotlight into a virtual back "room" or "stage." By way of yet another example, innocent parties, for example, minors may be urged into the safety of a virtual back room to protect them from antisocial behavior by others.

The user devices 115a through 115n in FIG. 1 are illustrated by way of example. Although FIG. 1 illustrates only two devices, the present disclosure applies to any system architecture having one or more user devices 115, therefore, any number of user devices 115n may be used. Furthermore, while only one network 105 is illustrated as coupled to the user devices 115a through 115n, the social network servers 101a-101n, the profile server 130, the web server 132, and a third party server 136, in practice, any number of networks 105 may be connected to these entities. In addition, although only one third party server 136 is shown, the system 100 may include one or more third party servers 136.

In some embodiments, the social network server 101a is coupled to the network 105 via a signal line 104. The social network server 101a includes a social network application 102, which comprises the software routines and instructions to operate the social network server 101a and its functions and operations. Although only one social network server 101a is described here, persons of ordinary skill in the art should recognize that multiple servers may be present, as illustrated by social network servers 101b through 101n, each with functionality similar to social network server 101a or different.

The term "social network" as used here encompasses its plain and ordinary meaning including, but not limited to, any type of social structure where the users are connected by a common feature or link, for example, Orkut. The common feature includes relationships/connections, e.g., friendship, family, work, a similar interest, etc. The common features are provided by one or more social networking systems, such as those included in the system 100, including explicitly-defined relationships and relationships implied by social connections with other online users, where the relationships form a social graph 134.

The term "social graph" as used here encompasses its plain and ordinary meaning including, but not limited to, a set of online relationships between users, such as provided by one or more social networking systems, such as the social network system 100, including explicitly-defined relationships and relationships implied by social connections with other online users, where the relationships form a social graph. In some examples, the social graph 134 may reflect a mapping of these users and how they are related.

It should be understood that social network server 101a and the social network software/application 102 are representative of a single social network. Each of the plurality of social networks 101a, 101b through 101n, is coupled to the network 105, each having its own server, application and social graph. For example, a first social network hosted on a social network server may be directed to business networking, a second directed to or centered on academics, a third directed to local business, a fourth directed to dating, and yet others directed to other general interests or perhaps a specific focus.

A profile server 130 is illustrated as a stand-alone server in FIG. 1. In other embodiments of the system 100, all or part of the profile server 130 may be part of the social network server 101a. The profile server 130 is connected to the network 105, via a line 131. The profile server stores profiles for all the users that belong to a social network. A third party server 136 is connected to the network 105, via signal line 137. A web server 132 is connected, via line 133, to the network 105. The web server 132 delivers access to content, via the internet, for example, by hosting websites or the like. Users may use the web browsers on their electronic devices to access websites or other data storage applications.

The social network server 101a includes a video communication broadcast stage manager unit 103a, to which user devices 115a through 115n are coupled via the network 105. In particular, user device 115a is coupled, via line 108, to the network 105. The user 125a interacts with the user device 115a to initiate a video communication, for example, a video conference or a video "chat," with others with whom the user 125a shares an affinity. Persons of ordinary skill in the art should recognize that the video communication broadcast stage manager unit may be stored in any combination, in the social network server 101a (illustrated by 103a), or in a user device 115a (illustrated by 103b), or in both, as illustrated in FIG. 1, or in only one of the devices or servers illustrated.

The user devices 115a through 115n can be a computing device, for example, a laptop computer, a desktop computer, a tablet computer, a mobile telephone, a personal digital assistant (PDA), a mobile email device, a portable game player, a portable music player, a television with one or more processors embedded in the television or coupled to it, or any other electronic device capable of accessing a network.

The network 105 is of conventional type, wired or wireless, and may have any number of configurations, such as a star configuration, token ring configuration, or other configurations known to those skilled in the art. Furthermore, the network 105 may comprise a local area network (LAN), a wide area network (WAN, e.g., the Internet), and/or any other interconnected data path across which one or more devices may communicate.

In another embodiment, the network 105 may be a peer-to-peer network. The network 105 may also be coupled to or include portions of one or more telecommunications networks for sending data in a variety of different communication protocols.

In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

In some embodiments, the social network server 101a, the profile server 130, the web server 132, and the third party server 136 are hardware servers including a processor, memory, and network communication capabilities. One or more of the users 125a through 125n access any of the social network servers 101a through 101n, via browsers in their user devices and via the web server 132.

Figure 2A:
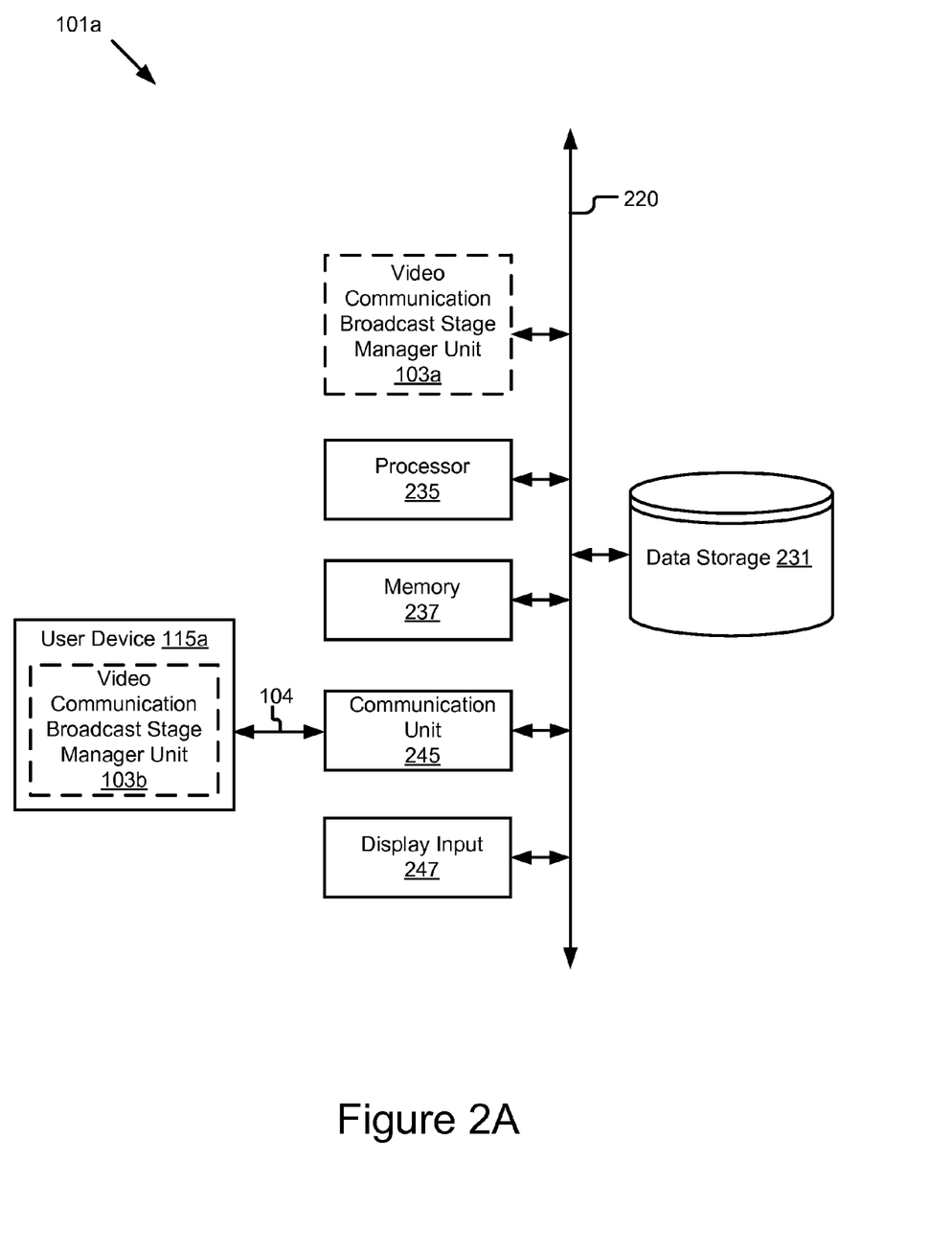
FIG. 2A is a block diagram illustrating some embodiments of a social network server shown in FIG. 1, including its hardware components.

FIG. 2A is a block diagram illustrating some embodiments of the social network server 101a. In FIG. 2A, like reference numerals have been used to reference like components with the same or similar functionality that has been described above with reference to FIG. 1. Since those components have been described above that description is not repeated here. The social network server 101a generally comprises one or more processors, although only one processor 235 is illustrated in FIG. 2. The processor is coupled via a bus 220 to memory 237 and a database storage 231, which stores the social graph data 134 (FIG. 1) and stores any information received from any of the other sources identified above. In some embodiments, the database storage 231 is a database organized by user. For each user, the data storage 231 stores data on video communications (for example, video conferences or video "chats" or "talk shows" or interviews hosted etc.) initiated, topics for discussion, other users involved etc. For example, this data may include related social network activity such as posts, shares, invitations, status changes etc., associated with a video communication. The data storage 231 may also store a topic for discussion and any information related to that topic.

A user 125a, via a user device 115a, communicates a request for a video communication or responds to a request via communication unit 245. The "set up" for a video communication is managed by the video communication broadcast stage manager unit 103a and 103b. It should be recognized that the video communication broadcast stage manager unit 103a and 103b are shown separately (illustrated with broken lines) as coupled to the bus 220 and within user device 115a because components of this manager may reside in a user's device, a social network server 101a, or alternatively, in a separate server, for example, the third party server 136 (in FIG. 1). A display input 247 is also coupled to the bus 220, which conveys the video source to the user device.

Figure 2B:
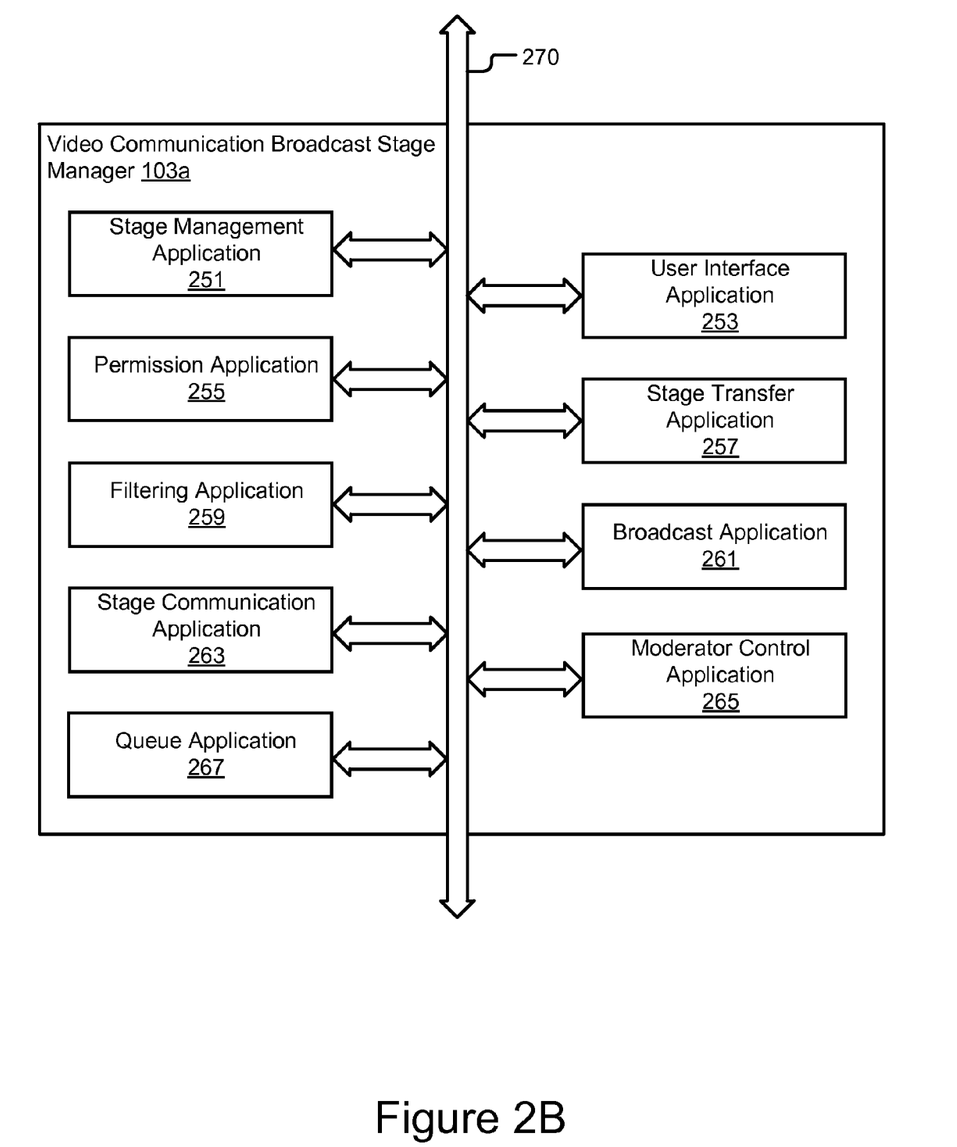
FIG. 2B is a block diagram illustrating some embodiments of the video communication broadcast stage manager and its software components.

Referring now to FIG. 2B, like reference numerals have been used to reference like components with the same or similar functionality that has been described above with reference to FIG. 1. Since those components have been described above, that description is not repeated here. The video communication broadcast stage manager 103a includes various modules that are programmed to perform the functionalities described here. These modules may be variously distributed (103a and 103b) or may be in a single unit (103a). A stage management application 251 is coupled to a software communication mechanism 270 to communicate with a user interface application 253, and a permission application 255. Examples of a software communications mechanism 270 may be an object bus (such as COBRA), direct socket communication (such as TCP/IP sockets) among software modules, remote procedure calls, UDP broadcasts and receipts, HTTP connections, function or procedure calls etc. Further, any or all of the communication could be secure (SSH, HTTPS, etc.). The software communication can be implemented on any underlying hardware, such as a network, the Internet, a bus 220 of FIG. 2A, a combination thereof etc. By way of example, a particular user 125a communicates via a user device 115a, to either request a video communication or respond to an invitation for a video communication. The user interface application 253 facilitates a connection of the user device 115a with the social network server 101a, in the event the video communication is via the social network server 101a. The permission application 255 ensures that the user device is compliant with protocols and any privacy concerns. Once a video communication has been set up, the stage management application 251 makes a note of the various users that are present for the video communication, for example, if they are ready and waiting for the video communication to begin. The stage management application 251 considers the status of the various users. For example, in the event the video communication is a "talk show" for broadcasting to viewers (for viewing on their display or viewing devices), the host of the talk show is identified and segregated from the guests for the "talk show." In this example, the host would be immediately designated as a "participant" and the guests would be designated as "guests" or "visitors" until they participate in the "talk show." To that end, the stage management application 251 sends the host participant to a virtual "front" stage or room (for example, illustrated in FIG. 5) and the guests to a virtual "back" stage or room (also illustrated in FIG. 5). The stage management application 251 communicates over bus 270 with a stage transfer application 257, which is programmed to perform the functionality of a transfer between the virtual "back" stage to the virtual "front" stage. Any activity in the back stage is filtered out by the filtering application 259, also coupled to communicate over bus 270. The filtering application 259 imposes restrictions for filtering out communications, which will be described in greater detail at a later point in this application. Only communication and activity that occurs in the front room is broadcast by broadcast application 261.

A stage communication application 263 is coupled via bus 270 to the other applications, including the broadcast application 261 and keeps the broadcast application informed of the status of stage with respect to each user, for example, whether a "participant" or a "guest." All guests waiting in the back stage form a queue under control of the application 267, for example, in the order of appearance. By way of one example, this may be by the order of appearance designated for the front stage if there is an order to guests participating in a "talk show." Alternatively, if there is no order that is pre-established, guests may appear in the order in which they joined the virtual back stage of the video communication. A moderator control application 255 is coupled by the bus 270 and serves to control and communicate between the front and back stages of the video communication.

Methods

Figure 3A:
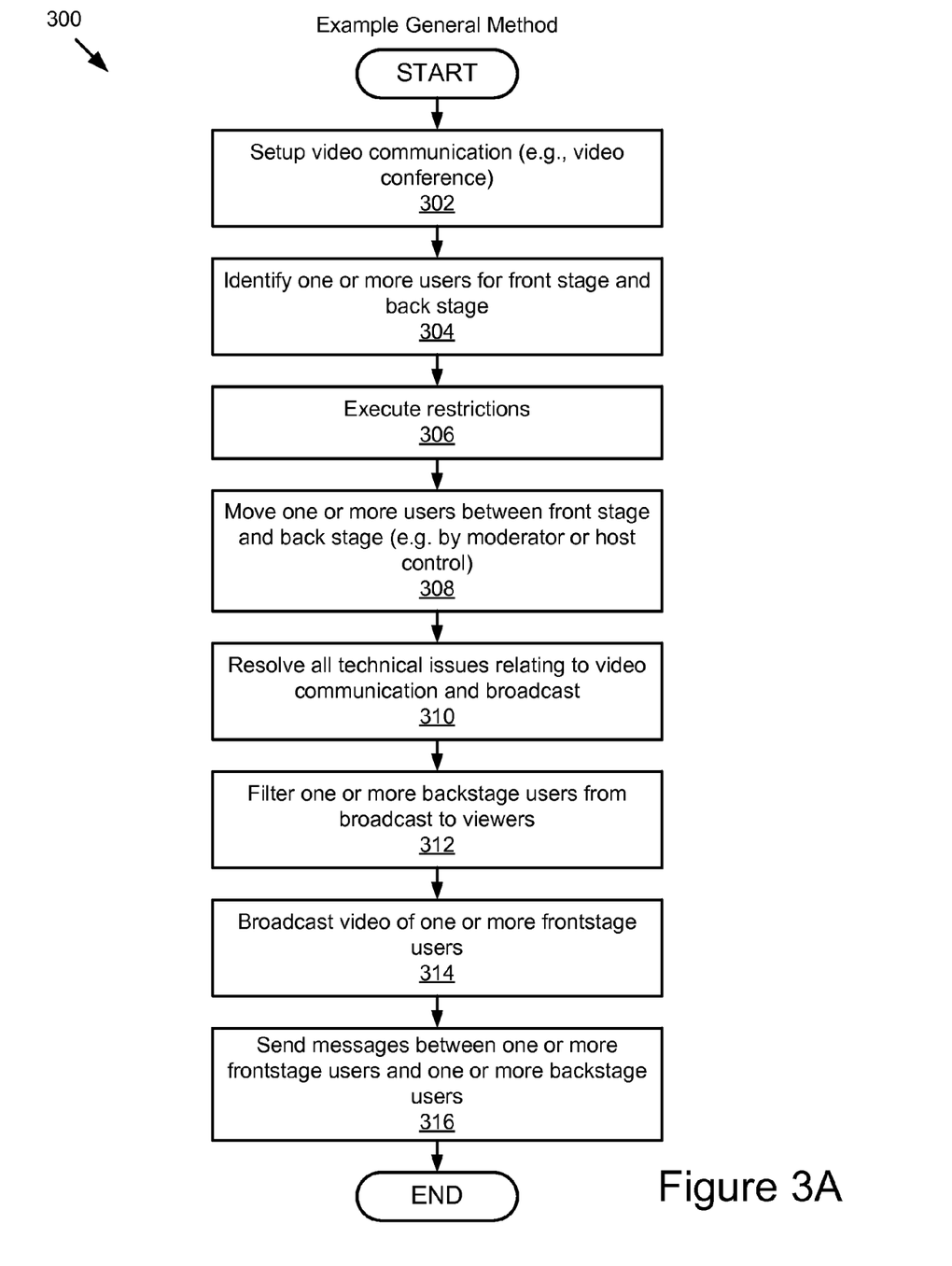
FIG. 3A is a flow chart illustrating an example general method for providing backstage support for online video communication broadcasts.

FIG. 3A is a flow chart illustrating one example of a general method for providing support for a video communication. In the method illustrated, which in this example is a video conference, the method begins with a set-up for a video conference, as illustrated by block 302. The method proceeds to the next block 304, at which point, one or more users (with their user devices) for the front stage and the back stage are identified. As explained above, the users necessary for the video conference are referenced to as "participants" and ushered into the virtual "front" stage or room. Similarly, those users who are determined unnecessary, at least for the time being, are deemed inactive and ushered into the virtual "back" stage or room to wait their turn. Yet other users, who are perhaps viewers and will never become participants, are coupled as viewers. These viewers may view the video communications via their viewing devices (illustrated in FIG. 6).

The method proceeds to block 306, at which stage, restrictions on the "back" stage are imposed and executed. These restrictions may require blocking an audio input stream from the virtual "back" stage to the virtual "front" stage. This may be accomplished by providing one or more controls for blocking the audio input stream including a) a control for an entity designated to moderate the video communication to block the audio input stream; or b) a control to facilitate remote muting of the audio input stream for any one or more of the users in the back stage; or c) a control for one or more of the participants in the front stage to select only the audio input stream that the participants in the front stage desire. Alternatively, instead of completely blocking the audio input stream, it may be preferable to lower the volume of an audio input stream from the back stage. The virtual "back" stage has limited functionality available to it.

Alternatively, or in addition to, these restrictions may require blocking a video input stream from the virtual "back" stage to the virtual "front" stage. This may be accomplished by providing one or more controls for blocking the video input stream in any of the following ways: 1) by providing one or more controls for blocking the video input stream including a) a control for an entity designated to moderate the video communication to block the video input stream; or b) a control to facilitate dimming of the video input stream from the back stage; or c) a control for one or more of the participants in the front stage to select only the video input stream that the participants in the front stage desire; or d) a control for a host of the video communication to view guests in the back stage.

The method proceeds to block 308, at which stage, one or more users 125a through 125n, may be moved between the virtual "front" stage and the virtual "back" stage, for example, under control of the moderator or the host, depending on to whom the task is assigned. The moderator or the host may receive an indication to move a particular user 125a, or may be the one that observes and provides the indication to move the particular user 125a.

The method proceeds to block 310, at which stage, all technical issues relating to the video communication and broadcast are resolved, before the particular user device 115a, is moved to the virtual "front" stage. The method proceeds to block 312, at which stage, one or more user devices 115a through 115n, in the virtual "back" stage are filtered out from the broadcast. In other words, only the communications that occur in the virtual "front" stage are broadcast to other user devices 115a through 115n (including those in the virtual "back" stage or the viewer devices (shown in FIG. 6), as illustrated at block 314. The method proceeds to block 316, at which point, messages between the back stage and the front stage are communicated offline, either via the moderator, the host, or a side channel set up for such communications.

Figure 3B:
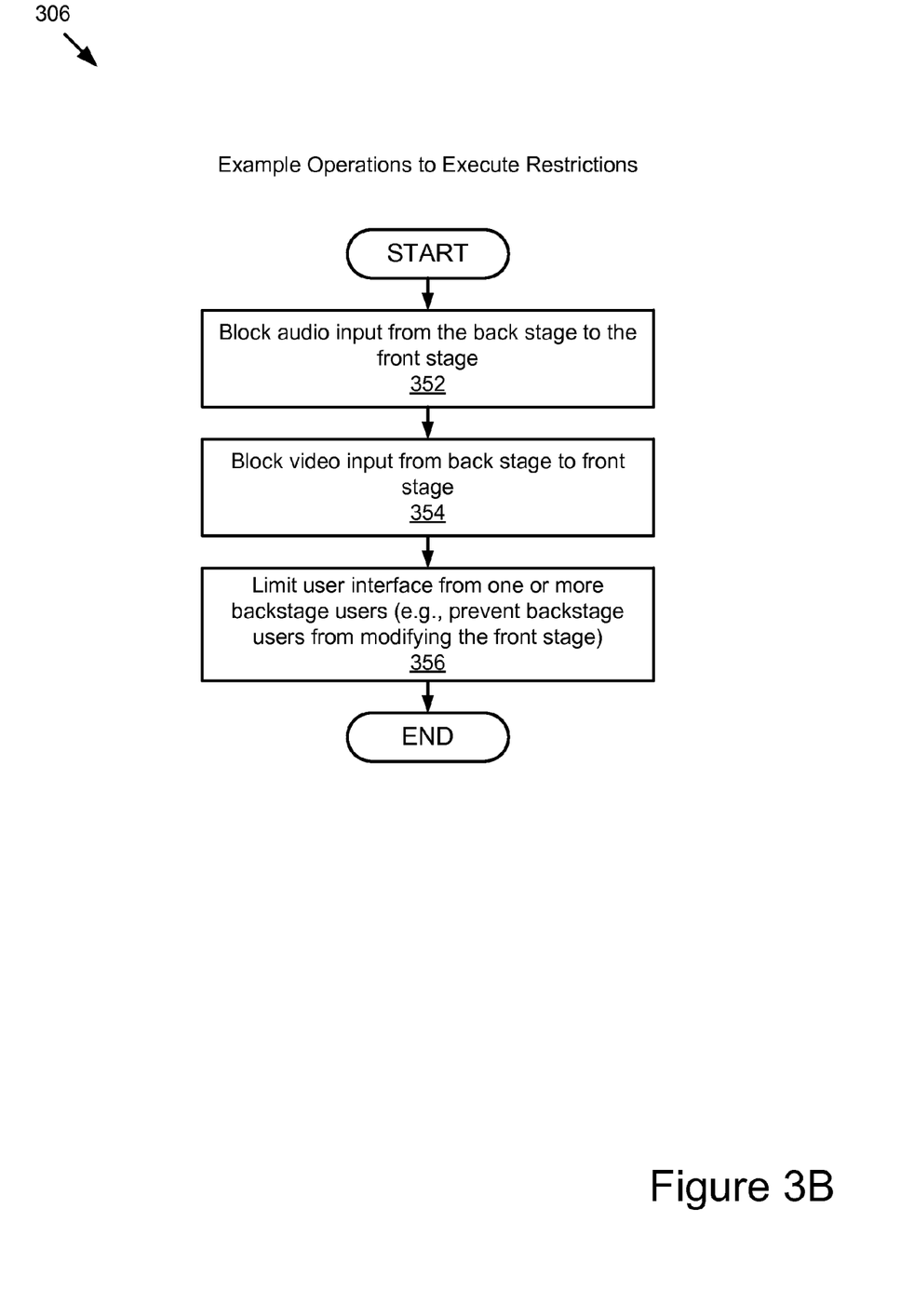
FIG. 3B is a flow chart illustrating example operations to execute restrictions (referenced in block 306 in FIG. 3A).

Referring now to the flow chart illustrated in FIG. 3B, some examples of operations to execute restrictions are described. As described above, restrictions may include blocking audio from the virtual "back" stage to the virtual "front" stage, as illustrated at block 252, or blocking video input from the virtual "back" stage to the virtual "front" stage, as illustrated by block 354, or limiting user interface from one or more "back" stage users, as illustrated by block 356. For example, user interface may be limited by preventing "back" stage users from modifying the "front" stage.

Figure 4:
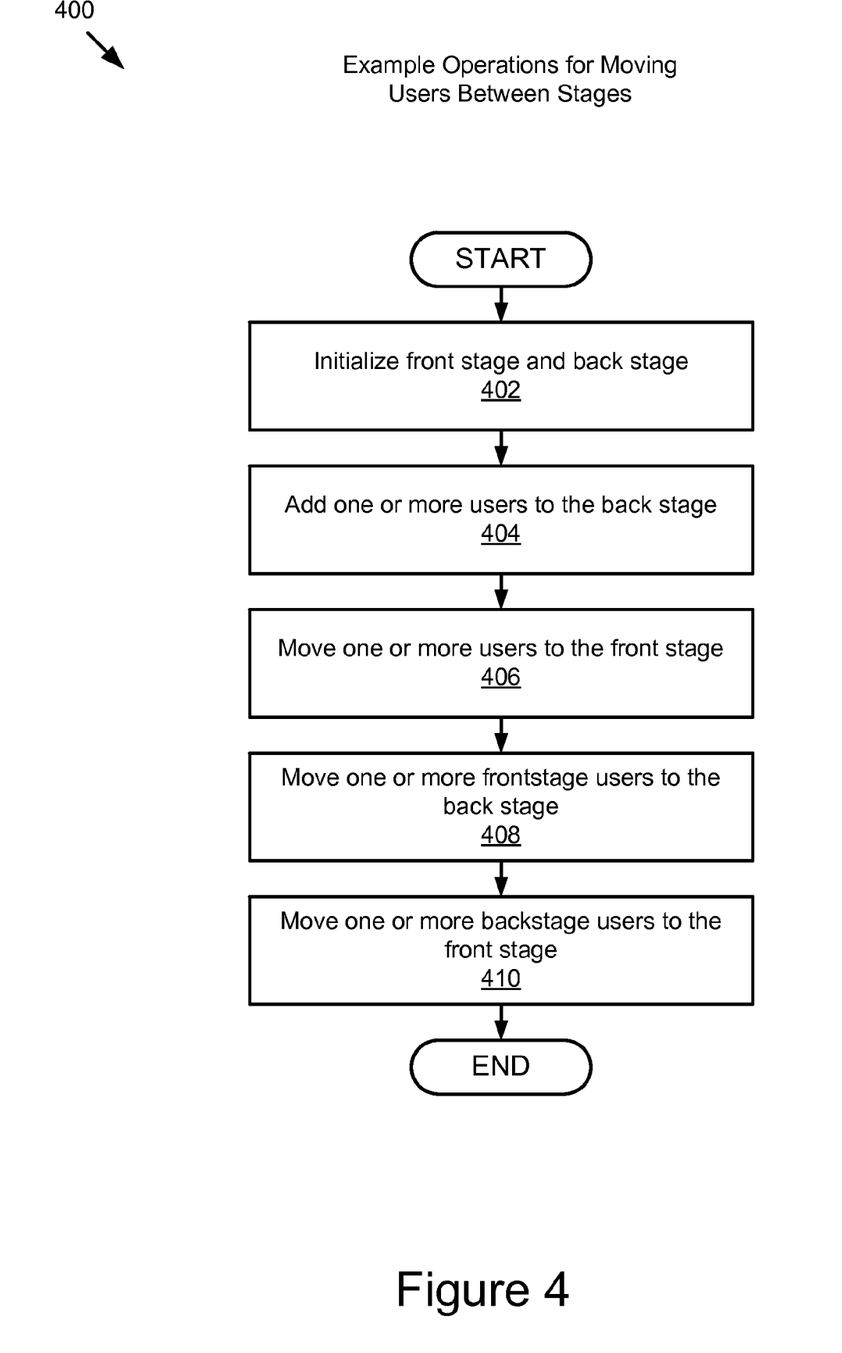
FIG. 4 is a flow chart illustrating example operations for moving users between stages (referenced in block 308 in FIG. 3A).
Figure 5:
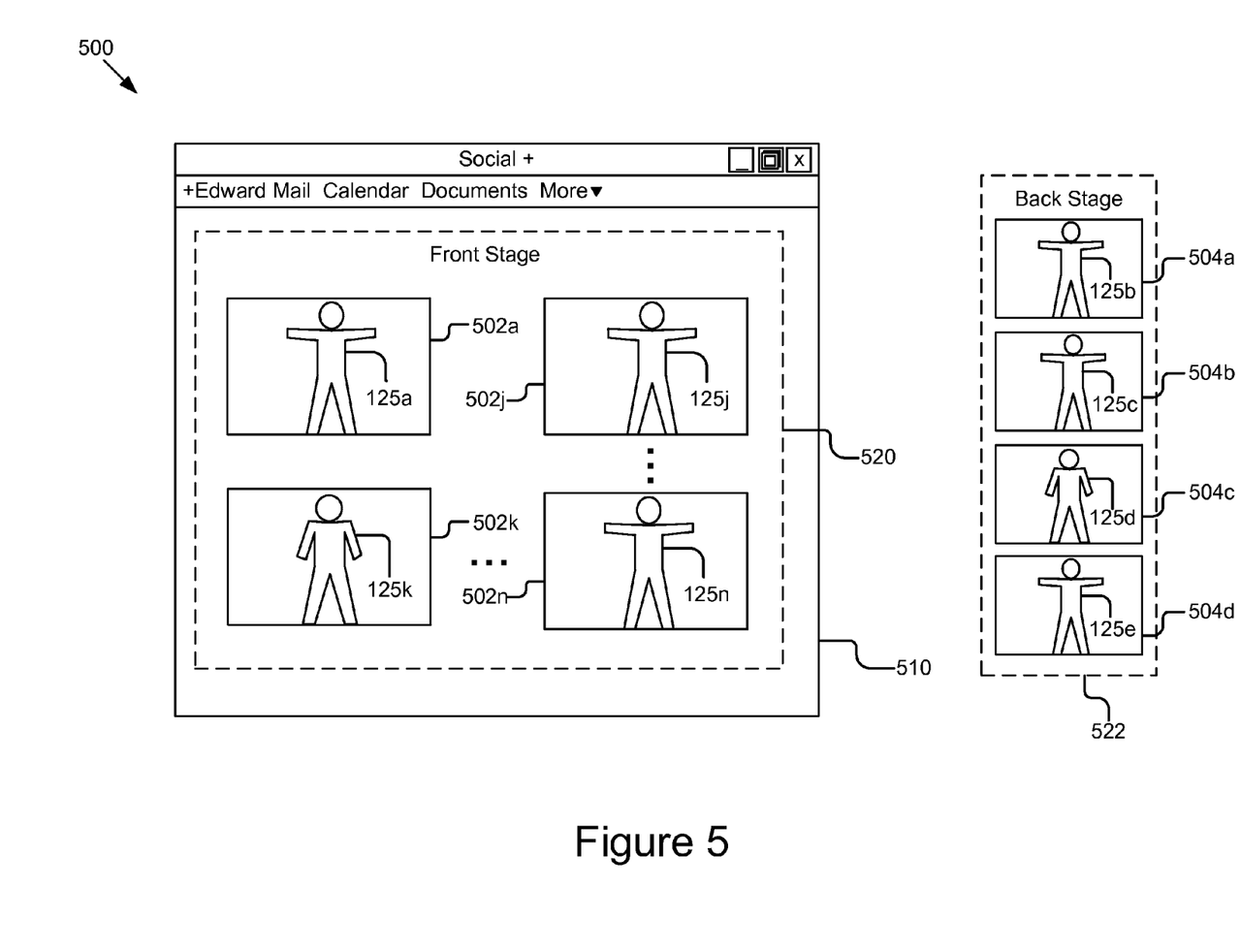
FIG. 5 is a graphical representation of a front stage and a back stage with examples of various users (participants and guests) illustrated in both stages.

Referring now to the flow chart illustrated in FIG. 4, some example operations for moving users between stages is illustrated. The method begins at block 402, at which point, the virtual "front" stage and the virtual "back" stage are initialized. The method proceeds to block 404, at which point, one or more user devices (for example, user devices 115b, 115c, 115d, and 115e, as illustrated in FIG. 5) are added to the back stage. The method proceeds to block 406, at which stage, the host or moderator determines if it is time to move one or more user devices (for example, user devices 115b, 115c, 115d, and 115e) to the "front" stage. At this stage, it may be appropriate to move one or more of the "front" stage user devices (for example, user devices 115a, 115k, 115j, through 115n, as illustrated in FIG. 5) to the "back" stage, as illustrated by block 408 and replace them with one or more additional user devices in the "front" stage, as illustrated by block 410.

Figure 6:
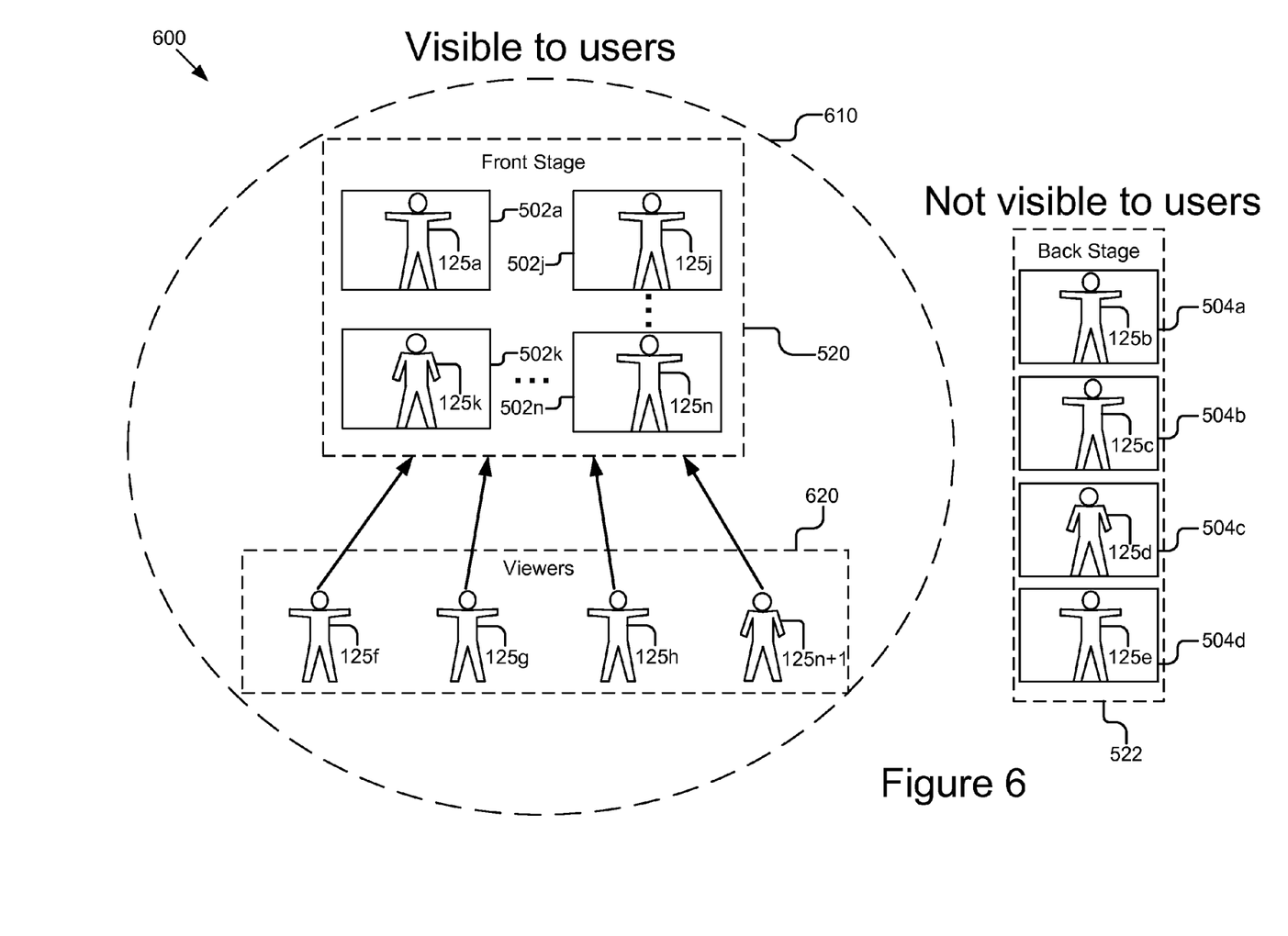
FIG. 6 is a graphical representation of a front stage and a back stage with examples of various users, illustrating that the front stage is visible to viewers and the back stage is not.

Referring now to FIG. 5, a display screen 510 of a particular user indicates four windows of user devices 502a, 502k, 502j, through 502n, depending upon the number of users and involved in a video communication, specifically, in the "front" stage 520. The four users 125a, 125k, 125k, and 125n are displayed in each display window of their respective user devices 502a, 502k, 502j, and 502n. A virtual "back" stage 522 illustrates that there are four other users 125b, 125c, 125d, and 125e, each displayed in a window of their respective user devices, 504a, 504b, 504c, and 504d, respectively. Referring also to FIG. 6, the "front" stage is visible to viewers 125f, 125g, 125h, and 125n+1, who can view activity in the "front" stage, via their respective viewing devices, for example shown collectively as view device 620. It should be recognized that any number of viewers may view on their viewer devices a broadcast that is "on air." Each of the viewer devices may be separate. The users 125*b*, 125*c*, 125*d*, and 125*e* on the "back" stage are not visible to the viewers, in the illustrated example, users 125*f,* 125*g,* 125*h,* and 125*n*+1.

Figure 7:
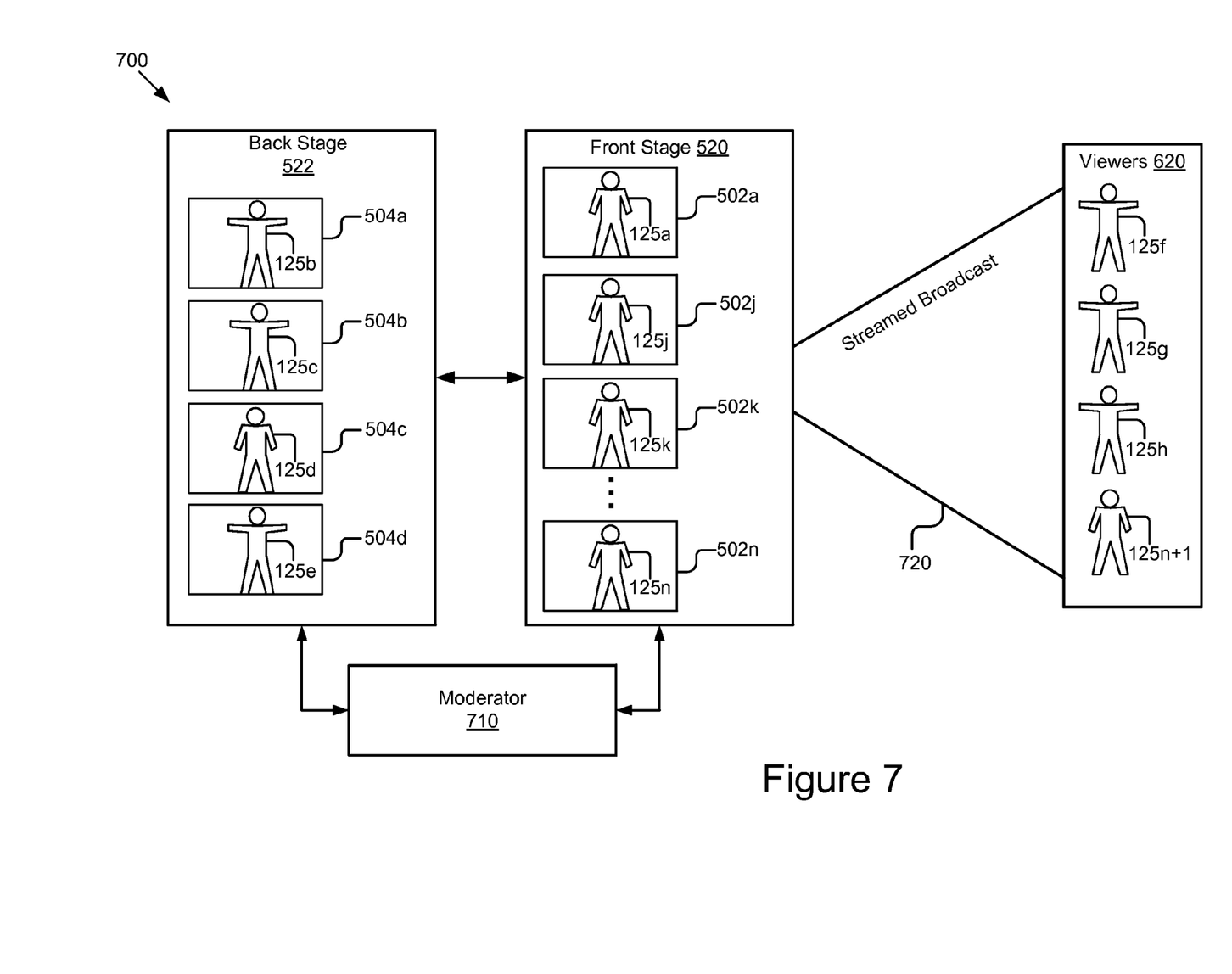
FIG. 7 is a graphical representation illustrating a moderator and a back stage and a front stage with a streamed broadcast only of the front stage.

Referring also to FIG. 7, the virtual "back" stage 522 and "front" stage 520 are illustrated, with the users 125*b*, 125*c*, 125*d*, and 125*e*, arranged in a queue from top to bottom, or first to last. The user 125*b* illustrated in the display window of user device 504*a*, the user 125*c* illustrated in the display window of user device 504*b*, the user 125*d* in the display window of user device 504*c*, and the user 125*e* illustrated in the display window of the user device 504*d* are arranged in a queue. It should be noted that the number of users illustrated here is by way of example, and should not be construed as limiting in any way. The number of users invited or accommodated in the virtual "back" stage of the video communication or the "back" room waiting to be aired may be any number of users, that may be invited, one by one, or in sets of users. The virtual "front" stage 520 illustrates users 125*a*, 125*j*, 125*k*, and 125*n*, each of whom is illustrated in display windows of user devices 502*a*, 502*j*, 502*k*, and 502*n*, respectively. Again, any number of users, depending upon the nature of the video communication, may be accommodated in the front stage 520. As indicated above, these users in the "front" stage 520 are those who are actively involved or engaged in the video communication. A moderator 710 is illustrated, who may also be a host, or in some cases, one of the participants in the "front" stage 520. The streamed broadcast 720 is, based at least in part, on the activity in the virtual "front" stage 520. It is aired to viewers 620, again any number of viewers (for example, hundreds, thousands, or even millions). In FIG. 7, viewers 125*f,* 125*g,* 125*h*, through 125*n*+1 are illustrated.

The foregoing description of the embodiments of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be embodied in other specific forms, without departing from the spirit or essential characteristics thereof. Likewise, the particular naming and division of the modules, routines, features, attributes, methodologies, and other aspects are not mandatory or significant, and the mechanisms that implement the present invention or its features may have different names, divisions and/or formats. Furthermore, as should be apparent to one of ordinary skill in the relevant art, the modules, routines, features, attributes, methodologies and other aspects of the present technology can be implemented as software, hardware, firmware, or any combination of the three. Also, wherever a component, an example of which is a module, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present invention, which is set forth in the following claims.

What is claimed is:

1. A computer-implemented method, comprising:
   identifying, using one or more computing devices, a status designation for each of a plurality of user devices configured for participation in a video communication and providing the video communication for viewing on spectator devices, wherein the status designation is at least one of an active status and an inactive status;
   first connecting a subset of the plurality of user devices with the active status for participation in the video communication and permitting viewing of the video communication on the spectator devices;
   restricting input into the video communication from one or more user devices with the inactive status, until a designated entity changes the inactive status to active status for each of the one or more user devices designated with the inactive status; and
   providing a group chat mode for communication flow among the one or more user devices with the active status and the one or more user devices with the inactive status, wherein communication in the group chat mode is screened for viewing by the spectator devices.

2. A computer-implemented method according to claim 1, wherein each of the one or more user devices with the inactive status is coupled for participation in the video communication and permitted for viewing on the spectator devices, upon a status change from the inactive status to the active status.

3. A computer-implemented method according to claim 1, wherein the video communication is a video conference, to which multiple user devices call in, and wherein a designated entity accords the active status and the inactive status to each of the multiple user devices, and wherein the video conference includes an audio input and a video input.

4. A computer-implemented method according to claim 1, wherein restricting the input comprises executing one or more restrictions on audio and video input by user devices with the inactive status, wherein at least one restriction prevents audio and video input by the user devices with the inactive status.

5. A computer-implemented method according to claim 1, wherein restricting the input includes blocking an audio input into the video communication by user devices with the inactive status.

6. A computer-implemented method according to claim 5, further comprising:
   providing control to the designated entity to block the audio input into the video communication, by enabling the designated entity to mute the audio input, as desired by the designated entity.

7. A computer-implemented method according to claim 1, wherein restricting the input includes blocking a video input into the video communication by user devices with the active status.

8. A computer-implemented method according to claim 7, further comprising:
   providing control to the designated entity to block the video input into the video communication, as desired by the designated entity.

9. A computer-implemented method according to claim 1, wherein restricting the input limits one or more capabilities available to user devices designated with the inactive status.

10. A computer-implemented method according to claim 1, wherein the designated entity changes the status for a particular user device from the inactive status to the active status upon receiving an indication to make a change.

11. A computer-implemented method according to claim 10, wherein the indication is conveyed by a message received via a control channel of communication established between user devices with the inactive status and the active status and the designated entity, wherein the control channel of communication is not permitted for viewing on the spectator devices.

12. A computer-implemented method according to claim 1, wherein the user devices with the inactive status await in a queue for change of status from inactive to active.

13. A system for permitting selective viewing of video communication streams, comprising:
   one or more processors; and
   a memory with embedded instructions, which when executed cause the one or more processors to:
      identify a status designation for each of a plurality of user devices configured for participation in a video communication and viewing of the video communication by spectator devices, wherein the status designation is at least one of an active status and an inactive status;
      connect a subset of the plurality of user devices with the active status for a predetermined level of video communication and permit viewing of the predetermined level of video communication by the spectator devices;
      restrict input by one or more user devices with the inactive status until a designated entity changes the inactive status to the active status for each of the one or more user devices; and
      provide a group chat mode for communication flow among the one or more user devices with the active status and the one or more user devices with the inactive status, wherein communication in the group chat mode is screened for viewing by the spectator devices.

14. A system according to claim 13, wherein each of the one or more user devices is coupled into the video communication for participation, upon a status change from the inactive status to the active status.

15. A system according to claim 13, wherein the video communication is a video conference, to which multiple user devices call in, and wherein each of the multiple user devices are accorded at least one of the active status and the inactive status, and wherein the video conference includes an audio input and a video input.

16. A system according to claim 13, wherein the input by the one or more user devices with the inactive status is restricted by executing one or more restrictions on at least one of audio input and video input, wherein at least one restriction prevents audio and video input by user devices designated with inactive status.

17. A system according to claim 13, wherein the input by the one or more user devices with inactive status is restricted by executing one or more restrictions on audio input, wherein as least one restriction blocks the audio input into the video communication by user devices designated with the inactive status.

18. A system according to claim 17, wherein the designated entity blocks the audio input by remotely muting the audio input as desired by the designated entity.

19. A system according to claim 13, wherein the input by the one or more user devices with inactive status is restricted by executing one or more restrictions on video input, wherein at least one restriction blocks the video input into the video communication by user devices designated with the inactive status.

20. A system according to claim 19, wherein the designated entity is provided control to block the video input.

21. A system according to claim 13, wherein the input by the one or more user devices with inactive status is restricted by limits on one or more capabilities available to the user devices designated with the inactive status.

22. A system according to claim 13, wherein the designated entity changes the status for a particular user device from the inactive status to the active status, upon receiving an indication to make a change.

23. A system according to claim 22, wherein the indication is conveyed by a message received via a control channel of communication established among user devices with the inactive and the active status and the designated entity.

24. A system according to claim 13, wherein the user devices with the inactive status await in a queue for change of status from inactive to active.

* * * * *